(12) United States Patent  
Nalborczyk

(10) Patent No.: US 11,398,704 B2  
(45) Date of Patent: Jul. 26, 2022

(54) FEED THROUGH VARISTORS WITH THERMALLY-ACTIVATED OVERRIDE

(71) Applicant: MPE IP LIMITED, Liverpool (GB)

(72) Inventor: Jan Nalborczyk, Liverpool (GB)

(73) Assignee: MPE IP LIMITED, Liverpool (GB)

( * ) Notice: Subject to any disclaimer, the term of this patent is extended or adjusted under 35 U.S.C. 154(b) by 868 days.

(21) Appl. No.: 16/071,193

(22) PCT Filed: Jan. 18, 2017

(86) PCT No.: PCT/GB2017/050106  
§ 371 (c)(1),  
(2) Date: Jul. 19, 2018

(87) PCT Pub. No.: WO2017/125725  
PCT Pub. Date: Jul. 27, 2017

(65) Prior Publication Data  
US 2021/0202140 A1    Jul. 1, 2021

(30) Foreign Application Priority Data

Jan. 19, 2016  (GB) ...................................... 1600953

(51) Int. Cl.  
*H01C 7/12*  (2006.01)  
*H01R 13/66*  (2006.01)  
(Continued)

(52) U.S. Cl.  
CPC ........... *H01R 13/6616* (2013.01); *H01C 7/12* (2013.01); *H01H 37/08* (2013.01); *H01H 37/54* (2013.01);  
(Continued)

(58) Field of Classification Search  
CPC . H01C 7/12; H01C 7/10; H01C 7/126; H02H 9/04; H02H 9/02; H02H 9/042;  
(Continued)

(56) References Cited

U.S. PATENT DOCUMENTS 4,638,284 A * 1/1987 Levinson ............... H01R 13/53  
338/21  
4,825,188 A * 4/1989 Parraud .................... H01C 7/12  
338/21  
(Continued)

*Primary Examiner* — Danny Nguyen  
(74) *Attorney, Agent, or Firm* — Amster, Rothstein & Ebenstein LLP

(57) ABSTRACT

A varistor (50) comprising: a feed-through conductor (52) and a varistor disc (72) interposed between, and electrically connected to, conductor layers disposed on opposite surfaces of the varistor disc (72), the conductor layers being electrically isolated from one another; wherein the varistor disc (72) comprises a through aperture (60) through which the feed-through conductor extends; a first one of the conductor layers is electrically connected to the feed-through conductor; a second one of the conductor layers is, in normal use, permanently electrically connected to ground the varistor (50). This configuration enables one side of the disc (72) to be connected to the feed-through terminal, and the other side of the disc (72) to be connected to a ground plane, such as an earthed bulkhead of a wall or cabinet, via a metal plate forming part of the varistor (50) housing.

16 Claims, 9 Drawing Sheets

(51) Int. Cl.
*H01R 13/713* (2006.01)
*H01R 24/30* (2011.01)
*H01H 37/08* (2006.01)
*H01H 37/54* (2006.01)
*H02G 3/22* (2006.01)
*H02H 9/04* (2006.01)
*H01R 101/00* (2006.01)
*H01R 103/00* (2006.01)

(52) U.S. Cl.
CPC ......... *H01R 13/7137* (2013.01); *H01R 24/30* (2013.01); *H02G 3/22* (2013.01); *H02H 9/041* (2013.01); *H02H 9/043* (2013.01); *H02H 9/044* (2013.01); *H01H 2037/5463* (2013.01); *H01R 2101/00* (2013.01); *H01R 2103/00* (2013.01)

(58) Field of Classification Search
CPC ........ H02H 9/041; H01H 85/02; H01H 83/10; H01H 85/0241
USPC .................................. 361/117–120, 124, 127
See application file for complete search history.

(56) References Cited

U.S. PATENT DOCUMENTS

| | | | |
|---|---|---|---|
| 5,206,780 A * | 4/1993 | Varreng | H02G 15/06 361/117 |
| 6,678,139 B1 * | 1/2004 | Greuter | H02G 15/06 361/117 |
| 2011/0013330 A1 * | 1/2011 | Crevenat | H01H 83/10 361/115 |
| 2013/0200986 A1 * | 8/2013 | Koprivsek | H01C 7/10 338/21 |
| 2013/0265687 A1 * | 10/2013 | Mosesian | H01T 1/14 361/124 |

* cited by examiner

FEED THROUGH VARISTORS WITH THERMALLY-ACTIVATED OVERRIDE

This invention relates to varistors.

Varistors have long been used as protection devices in electronic and electrical circuits. A varistor contains a piece of material having special electrical properties, that is to say, it is substantially dielectric (an electrical insulator) at low voltages, but which undergoes dielectric breakdown above a specified threshold voltage, thus rendering it electrically conductive.

A varistor can thus be wired between an input power supply connection of an electrical device or circuit and ground, and will not short to ground under ordinary operating conditions, that is to say, where the input voltage is within certain design parameters. However, should the power supply be subjected to a high voltage transient or an electromagnetic pulse ("EMP"), for example during an electrical storm (e.g. if an overhead powerline is struck by lightning); or as a result of a malicious attack (e.g. if a EMP or IEMI weapon is deployed), then the dielectric breakdown threshold value of the varistor will be temporarily exceeded thereby shorting the input voltage, and hence the transient pulse, to ground. Provided the varistor is placed upstream of the power input of a device or circuit to be protected, it will provide effective protection against EMP, IEMI, and other high voltage transient pulses.

Varistors are a mature technology and are almost ubiquitous in sensitive electronic applications and devices, such as in computers and military equipment, in hospital power distribution networks and the like.

The most important parameters of varistors are their voltage rating (which is based on the supply voltage they are being used on), their energy and peak pulse current handling (i.e. the highest current and energy that can be applied before irreversible damage is caused to it) and their reaction times (i.e. the time taken to transition between the insulating and conducting states). In military applications, where the devices to be protected are most susceptible to malicious EMP and IEMI attacks, there is an ever-increasing need for varistors that exhibit ever higher maximum voltage capacities and ever shorter reaction times—as a result in advances in EMP weaponry, which are currently capable of delivering fast, high energy pulses with rise times of 1-5 ns or even faster. There is also an increasing awareness of the vulnerability of commercial critical infrastructure to the threats of EMP and IEMI. Large varistors can handle the peak currents and energies required but they struggle to operate quickly enough.

Existing varistors are at the limits of their effectiveness against, fast high energy pulses with rise times faster than say 20 ns mainly due to their reaction times, which are typically claimed to be in the 35 ns range for commercial packaged varistors.

The main factor limiting the reaction time of any varistor is its physical connection to the circuit or device to be protected. Its intrinsic operating speed is reported to be around 200 ns, but this is limited by its connections. Varistors typically comprise two terminals: an input terminal, which is connected to the incoming power supply; and an output terminal, which is connected to ground. These terminals are usually connected to the circuit or device to be protected and earth (respectively) using flying leads. The use of flying leads, however short, is generally considered to be problematic for two reasons.

Firstly, at high frequencies above say 10 MHz RF coupling will occur between cables on the unprotected and protected sides of the circuit. This means that part of the transient pulse will by-pass the varistor altogether and continue along the power cables to damage the electronic equipment Secondly, the flying leads act as inductors wired in-series with the varistor, thus slowing its reaction time.

An example of a known high energy varistor 10 is shown in partial cut-away view in FIG. 1 of the drawings. The known varistor 10 comprises a plastic insulating housing 12, which can be affixed to the housing of an electronic device using screws (not shown) passing through various screw holes 14. One end of the main body portion 12 comprises a terminal block 16, which has a generally T-shape when viewed from above, the spine 18 of which being used to physically separate a pair of screw connection terminals 20, 22 to which an incoming power cable 24 and a ground cable 26 can be affixed. Inside the main body portion 12, there is a cavity 28, which houses a varistor disc assembly 30 comprising a disc 32 of material, exhibiting the requisite dielectric-conductor property previously described, sandwiched between a pair of metal contact plates 34, which are connected to the terminals 20, 22 internally via fly leads or bus bars 36 (illustrated schematically in FIG. 1).

It will be apparent to the skilled reader that, due to the physical shape and dimensions of the varistor disc assembly 30 within the cavity 28, that the internal flying leads or bus bars 36 are required to make the connections to the terminals 20, 22 and that these act as inductors in the circuit, thus increasing the reaction time of the varistor disc 32. Further, the external power 24 and ground cables 26 will also act as additional inductors, further increasing the reaction time of the disc. In use, one of the terminals 22 will be connected to ground 66 via a cable 26. The other terminal 20 will be connected, via a flying lead 24 to a main terminal 27, which connects the incoming "dirty" power input 23 to an outgoing flying lead, which in-turn connects to a load 25 protected by the varistor 10.

Because the incoming 21 and outgoing power cables 29 are adjacent to each other with no shielding between them (as this is not practical), they will both act as antennas at high frequency and some high frequency coupling (as indicated by radiating lines 31 in the drawing) will occur from the incoming 21 to the outgoing cables 29 thus by-passing the suppression effect of the varistor 10. The reduction in effectiveness of the varistor 10 as a result of this will be very significant at frequencies above say 100 MHz and will depend on the lengths and orientations of the cables 21, 29.

Another known type of switching varistor is described in German Utility Model No:

A need therefore exists for a solution that addresses or overcomes one of more of the drawbacks of known varistors, in particular, a) how to directly connect the varistor disc to the power cables being protected without introducing inductance and/or how to reduce the length of any conductors needed to do so, b) how to provide shielding between incoming and outgoing power cables to avoid by-pass coupling thus allowing the varistor to work to its full capability. Additionally or alternatively, a need exists for an alternative varistor construction.

A further problem that is known to exist with varistors is their degradation over time. Initially, and as previously explained, the varistor disc is substantially dielectric (an electrical insulator) at low voltages, and undergoes a sharp dielectric breakdown above a specified threshold voltage, thus rendering it electrically conductive. However, the permanent application of a voltage across the varistor disc, as happens in normal use, is believed to lead to electromigration of species and impurities within the disc, which eventually renders the disc slightly conductive. This results in Ohmic resistance, which tends to heat the varistor disc, thus accelerating the electromigration, and thus accelerating the disc's degradation. It will be appreciated that if the varistor disc has a significant conductivity, it will tend to leak current to ground, thus degrading the protection conferred thereby, and also leading to a potentially permanent fault situation. Due to the resistance heating that occurs when the varistor disc begins to degrade, it is possible to detect the onset of failure by monitoring the temperature of the varistor disc, and by taking appropriate measures (e.g. replacement) as and when necessary. However, this requires regular monitoring of the varistor disc, and if the varistor disc fails suddenly (i.e. in a shorter time than the expected service interval), the protection afforded by the varistor can be compromised. A need therefore exists for a solution to this problem.

It will be appreciated that whilst this disclosure is written in the context of powerline protection, the invention is equally applicable to signal line applications and should be construed and understood accordingly.

According to the present invention there is a varistor as set forth in appended claim 1. Preferred or optional features of the invention are set forth in the appended dependent claims.

Compared with an existing disc-type varistor (whose varistor disc would, ordinarily be connected to the circuit using conductor bars, or wires), embodiments of the present invention may differ by provision of a hole in the varistor disc and by use of a feed-through conductor with power input and power output terminals located on opposite sides of the varistor disc. This separates the "dirty" power input from the "clean" power output using the varistor and its housing and mounting as an RF shield between input and output. The invention also provides connecting one side of the varistor disc directly to the feed-through terminal and the other side of the varistor disc directly to ground.

The thermally activated override addresses the problem of degradation of the varistor disc over time.

In the context of the present disclosure, "direct" means without elongate flying leads, although there could be electrical coupling members, e.g. metal coatings, solder junctions, conductive gaskets, etc., but in any case, there are no elongate flying leads. This configuration enables one side of the disc to be connected to the feed-through terminal, and the other side of the disc to be connected to a ground plane, such as an earthed bulkhead of a wall or cabinet, via a metal plate forming part of the varistor housing.

In another aspect of the invention, there is provided a varistor comprising: a feed-through conductor and a varistor disc interposed between, and electrically connected to, conductor layers disposed on opposite surfaces of the varistor disc, the conductor layers being electrically isolated from one another; wherein the varistor disc comprises a through aperture through which the feedthrough conductor extends, and wherein a first one of the conductor layers is electrically connected to the feedthrough conductor, and wherein a second one of the conductor layers is, in use, permanently electrically connected to ground.

Suitably, the varistor disc comprises a sheet (of any shape) of material that is substantially dielectric at low voltages, but which is substantially conductive at high voltages.

The feedthrough conductor is connectable, in use, via its opposite ends, which are located on either side of the varistor disc, to an incoming power supply and to the power input of a device to be protected, respectively. The invention thus differs from known varistors by the provision of a feed-through conductor, which makes the varistor a truly in-line, or feed-through, device. It also shields the input from output power conductors by having them on opposite sides of the varistor disc. In other words, when the varistor disc is in its insulative state, the varistor is "invisible" to the protected device or circuit because current flows, in-series, through the feed-through conductor only.

The invention also differs from known switching varistors, such as those described in German Utility Model No: DE202012011312U inasmuch as the varistor disc is permanently electrically connected to ground. Thus, the varistor is able to short EMP to ground under any conditions: it not being a requirement for another condition to be met as well, for example, a specified temperature range, as in the case of German Utility Model No: DE202012011312U.

Suitably, the feed-through conductor comprises a metal rod that extends through an aperture in the varistor disc. The ends of the feed-through conductor are suitably threaded to facilitate connecting the varistor to an electrical or electronic circuit.

In other variants, for example, in signal lines with lower current-carrying requirements, the feedthrough conductor could be just a wire for soldering rather than a threaded conductor The varistor disc is manufactured from a sheet of material that is substantially dielectric at low voltages, but which is substantially conductive at high voltages, such as a Zinc Oxide material doped with various other oxides in proprietary formulations. The low voltage is suitably a designed or normal operating voltage of a connected device, for example, less than 500V, e.g. 277 VAC (US 3-phase), 250 VAC (UK mains), 220 VAC (EU mains), 120 VAC (US mains), 95 VAC (analogue telephone lines), 48 VDC (telecoms), 28 VDC (military vehicles), 24 VDC (vehicles), 12 VDC (vehicles), 9, 3 or 1.5 VDC (electronics), etc., whereas the high voltage suitably corresponds to any high voltage transient superimposed on the line. This would normally be in excess of 1 kV, and could be attributable to e.g. switching transients but the invention is aimed more specifically at transients including high frequency high energy content such as EMP (electromagnetic pulses) or EMI (electromagnetic interference) which could typically be up to 300 kV.

The varistor disc is interposed between, and electrically connected to, conductor layers disposed on opposite surfaces of the sheet, which conductor layers may comprise a metal surface coating layer deposited onto; or a metal disc adhered, brazed, soldered or otherwise electrically connected to, opposite sides of the varistor disc.

In certain embodiments of the invention, the varistor disc is suitably substantially circular and the feed-through conductor suitably extends through a central through aperture therein. However, in other embodiments, the varistor disc is non-circular: the use of the term varistor "disc" herein is employed merely because most varistor materials are provided in disc or wafer form, although any shape of sheet of material that is substantially dielectric at low voltages, but which is substantially conductive at high voltages may be employed to substantially similar effect.

The conductor layers are electrically isolated from one another in normal use (that is to say, when the varistor disc is in its dielectric state). This may be accomplished in any number of ways, for example, by the dimensions of the conductor layers being different than that of the varistor disc (thus leaving a small peripheral gap around the edges of the varistor disc); or by the addition of an insulating rim around the varistor disc and/or around the periphery of the through hole, thus electrically isolating the conductor layers from one another.

Thus, at low voltages, the varistor disc electrically insulates the conductor layers from one another, thus forming an open circuit condition between the feed-through conductor and ground. However, at high voltages, the varistor disc becomes electrically conductive, thus forming a closed-circuit condition permitting the EMP or high voltage transient pulse to be shorted to ground via the varistor disc.

As previously mentioned, the first conductor layer is electrically connected to the feed-through conductor. This may be accomplished via a direct connection between the first conductor layer and the feed-through conductor, e.g. by soldering, brazing or the like. In other embodiments of the invention, a mechanical-electrical connection is formed between the first conductor layer and the feed-through conductor, such as via a conductive bush or gasket, a screw fitting or the like.

Additionally, the second conductor layer is permanently electrically connected, in use, to ground. This may also be accomplished via a direct connection between the second conductor layer and ground, e.g. by soldering, brazing or the like. However, for practical purposes, a preferred connection method involves providing one or more electrodes on the second conductor layer, which electrodes can be pressed into electrical engagement with a grounded conductive surface, via a conductive gasket, this grounded conductive surface typically being a metal plate forming part of the varistor housing. This metal plate and varistor housing may subsequently form a permanent connection to a grounded metal bulkhead being part of a shield wall or cabinet on which the varistor assembly is mounted in order to provide its transient protection function. Such a configuration provides a direct connection between the second conductor layer and a ground plane.

In preferred embodiments of the invention, the varistor disc and the two conductor layers are arranged substantially perpendicular to a longitudinal axis of the feed-through conductor. This configuration places the input and output ends of the feed-through conductor on opposite sides of the varistor disc, and when used in conjunction with a grounded conductive surface of bulkhead, shielded wall or cabinet containing a device to be protected, places the input and output ends of the feedthrough conductor on opposite sides of the ground plane. This configuration greatly reduces, or eliminates, RF coupling between cables affixed to the input and output ends of the feed-through conductor.

The varistor disc comprises a through aperture through which the feed-through conductor extends, although it will be appreciated that the varistor may comprise more than one feed-through conductor and a corresponding number of through apertures in the varistor disc. Such a configuration may be desirable where both the live and neutral connections of a device need to be protected, in which case, a live and neutral feed-through conductor may be provided; or in a three-phase system, whereby the three phases may require protection from EMP in a single device. Providing more than one feed-through conductor per varistor disc may have the additional benefit of automatically disconnecting more than one conductor from a protected device or circuit, even when the EMP is only present at one conductor: this suitably occurs because in an EMP event on any of the pass through conductors sharing a common varistor disc, the entire varistor disc becomes conductive, albeit temporarily, thus automatically shorting all of the feed-through conductors to ground simultaneously. This configuration may advantageously avoid load imbalances, or lack of synchronisation, which may occur where each conductor is protected independently.

It will be appreciated that one or more advantages may flow from the invention, such as:

By connecting the conductor discs directly to the feed-through conductor and ground, there may be no flying leads connecting the varistor disc to the circuit either within the varistor assembly housing or via external connections. This suitably improves the reaction time of the varistor because of negligible inductance of the connection method.

The provision of a feedthrough conductor extending substantially perpendicularly through an aperture in the varistor disc enables the second conductor disc to be directly connected to a ground plane, such as a metal bulkhead, shielded wall, or cabinet housing a protected device. This configuration interposes the ground plane between the input and output ends of the feed-through conductor. As a result, the input and output connections to the varistor disc can be located on opposite sides of an earthed ground plane, thereby reducing the likelihood of RF coupling between the varistor's input and output, and/or the varistor disc being effectively bypassed (by RF cross-talk) at high frequencies; and Because the varistor disc and its conductor discs (the varistor disc assembly) has an inherent capacitance, and a very low (if not negligible or zero inductance), the need for a for a downstream L-C filter circuit may be redundant or reduced. The reason for this is that an L-C circuit is traditionally employed to "slow" the EMP pulse so that the varistor can react in sufficient time. However, as in the case of the invention, the inductance of the varistor is considerably reduced, thus increasing its reaction and obviating the need for a "slowing" circuit. This can greatly simplify the implementation of EMP protection in electronic or electrical circuits and/or devices.

In addition, the intrinsic capacitance of the varistor disc coupled with the fact that it is mounted in a feed-though configuration will provide a filtering function offering typically 50 db of insertion loss at 1 GHz. This filtering feature will remove high frequency noise from the feed-through conductor by shunting it to ground and will occur even if the noise voltage is below the threshold or trigger voltage of the varistor.

In a preferred embodiment of the invention, the thermally-activated override is implemented using a bimetallic disc electrically connected in-series between the varistor disc and ground. The bimetallic disc is suitably configured to undergo a one-way shape change upon heating, that is to say, having a first shape at first (relatively low) temperature and a second shape at a second (relatively higher) temperature, but which is configured such that when the temperature returns to the first temperature the bimetallic disc does not return to its first shape. A one-way, thermally-induced shape property can be used to form an electrical connection between the varistor disc and ground at the low temperature, but to permanently disconnect the varistor disc from ground if the varistor disc is heated to, or above, the second temperature.

In certain embodiments of the invention, the bimetallic disc can be part-spherical, and/or conical and/or may additionally comprise a circular ridge. Such a configuration may enable the bimetallic disc to "snap" from its first shape to a second shape upon heating above a threshold temperature, and to remain "snapped" in the second shape regardless of subsequent cooling. This provides a permanent disconnect of the varistor disc in the event of heating above a specified threshold temperature.

Additionally or alternatively, the thermally-activated override is implemented using a one-way shape memory alloy electrically connected in-series between the varistor disc and ground. One-way shape memory alloy is suitably configured to undergo a one-way shape change upon heating, that is to say, having a first shape at first (relatively low) temperature and a second shape at a second (relatively higher) temperature, but which is configured such that when the temperature returns to the first temperature the one-way shape memory alloy does not return to its first shape. As described above, this one-way, thermally-induced shape property can be used to form an electrical connection between the varistor disc and ground at the low temperature, but to permanently disconnect the varistor disc from ground if the varistor disc is heated to, or above, the second temperature.

The one-way shape memory alloy can be of any suitable configuration, for example a helical spring, which shortens upon heating above a specified temperature, but which does not return to its original shape upon subsequent cooling. Suitable one-way shape memory alloys for this purpose include, but are not limited to, certain Ni—Ti alloys. In another embodiment, the shape memory alloy can be used to actuate a more conductive spring contact, for example, as a trigger or as part of a release mechanism.

A further feature that could be added to the invention is that of a monitor point to indicate when the varistor has failed (i.e. been disconnected). Suitably, this may be implemented by a wire electrically connected to the live side of the varistor disc and to an external terminal on the varistor case for monitoring purposes. Under normal operating conditions, this wire will present a "live" e.g. 240V signal, but when the disconnect device has been actuated, this signal voltage will change to 0 V, indicating a disconnect. The external terminal could be connected to a sensing circuit, which relays the status of the signal to a remote monitoring station, or it could be connected to an indicator light, such as a neon, built into the varistor housing. The indicator light, where provided, may additionally comprise a protection circuit to protect it from EMP or other high voltage pulses. Such a configuration may enable the indicator light to be illuminated if the varistor is functioning correctly and go out (extinguish) if the varistor disc became disconnected.

Hence this invention now provides three functions in one compared to the standard varistor which is just a transient suppressor. These are:
1. Transient suppressor (but with extended high frequency performance compared to standard varistor);
2. Provides RF Shielding between "dirty" unprotected, input side and "clean", protected output; and
3. High frequency filtering as a feedthrough capacitor.

All of these three features are necessary in a protector for HEMP (high-altitude electromagnetic pulse) and IEMI (intentional electromagnetic interference) applications so this single unit providing all three functions offers a novel approach.

Various embodiments of the invention shall now be described, by way of example only, with reference to the accompanying drawings in which.

Figure 1:
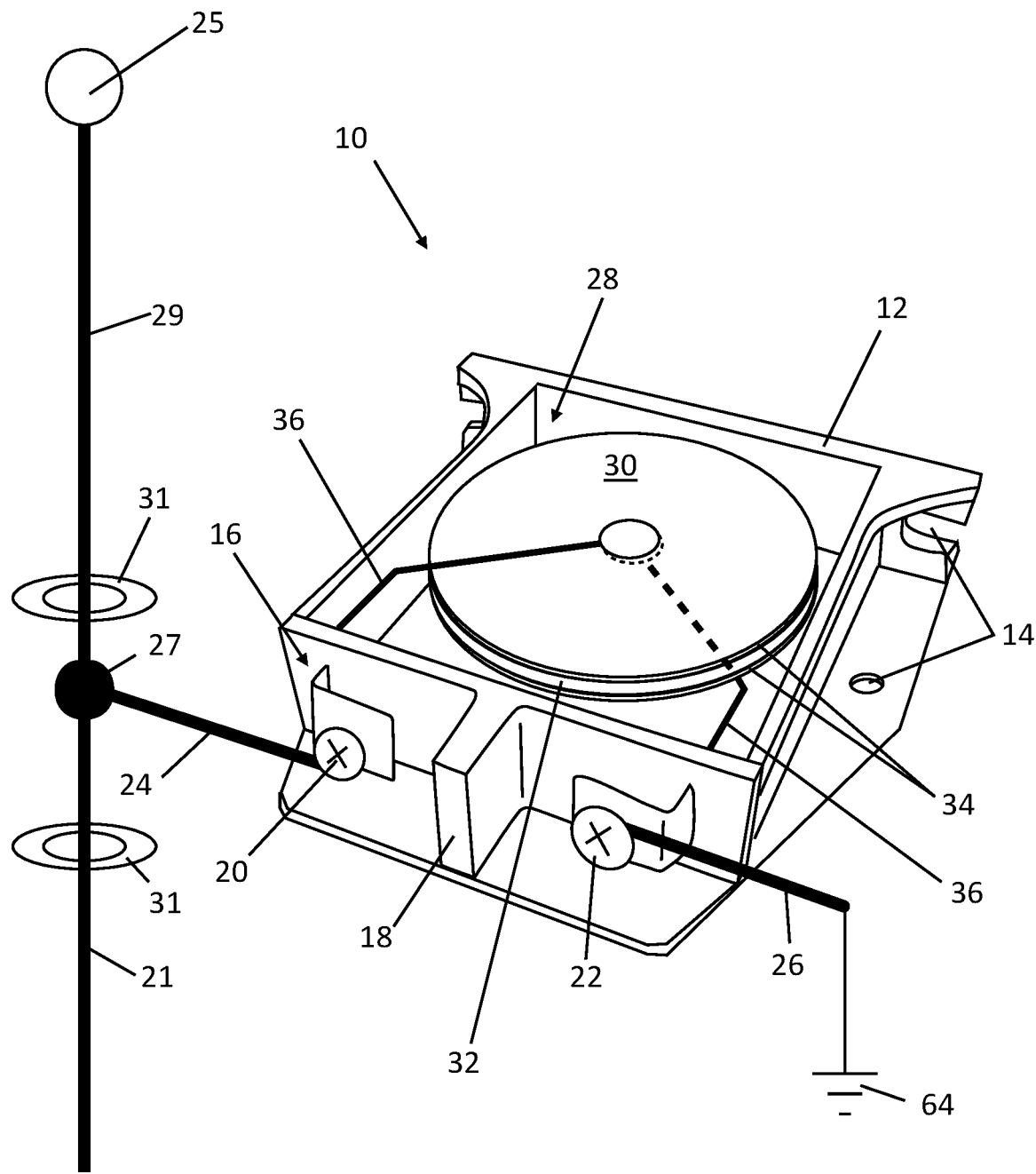
FIG. 1 is a partial cut-away view of a known varistor.
Figure 2:
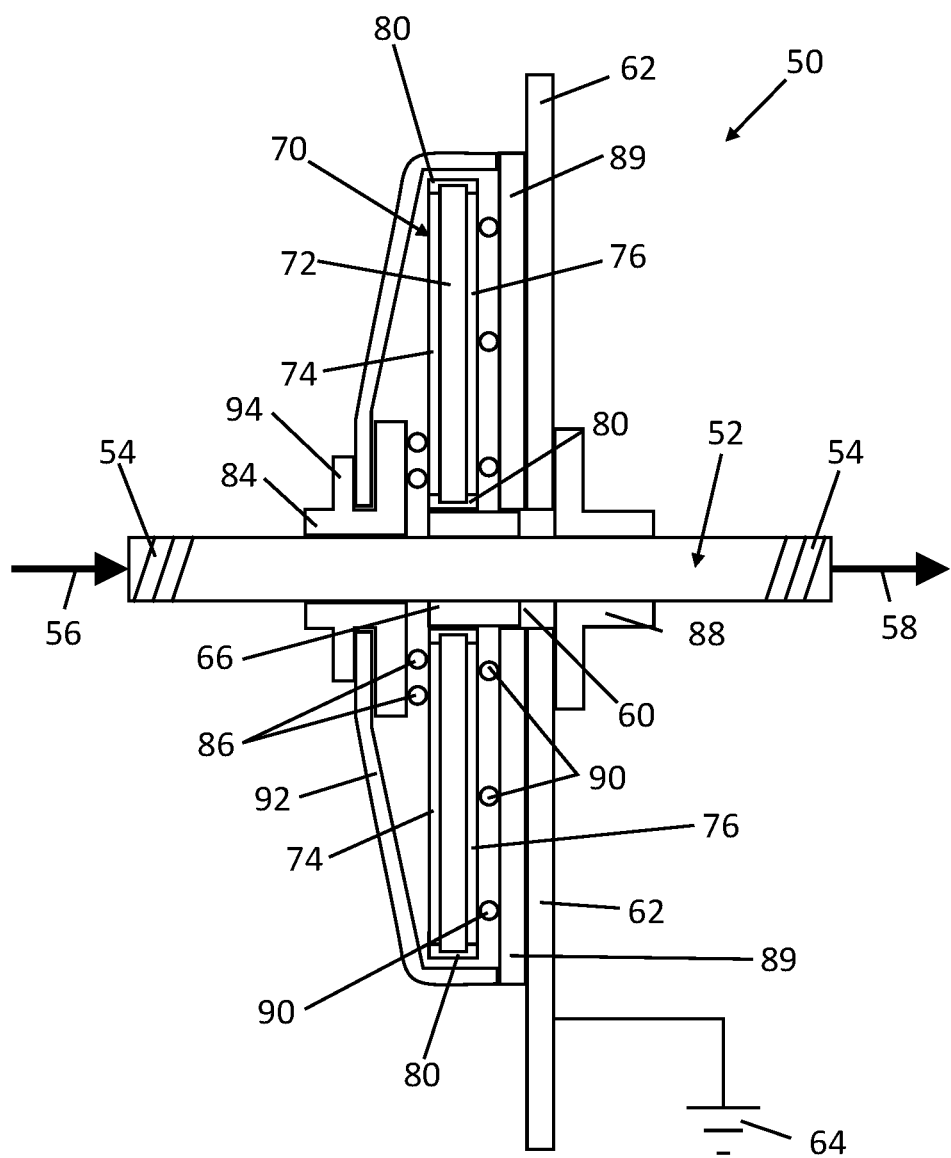
FIG. 2 is a schematic cross-section of an embodiment of a feed-through varistor without a thermally-activated override.
Figure 3:
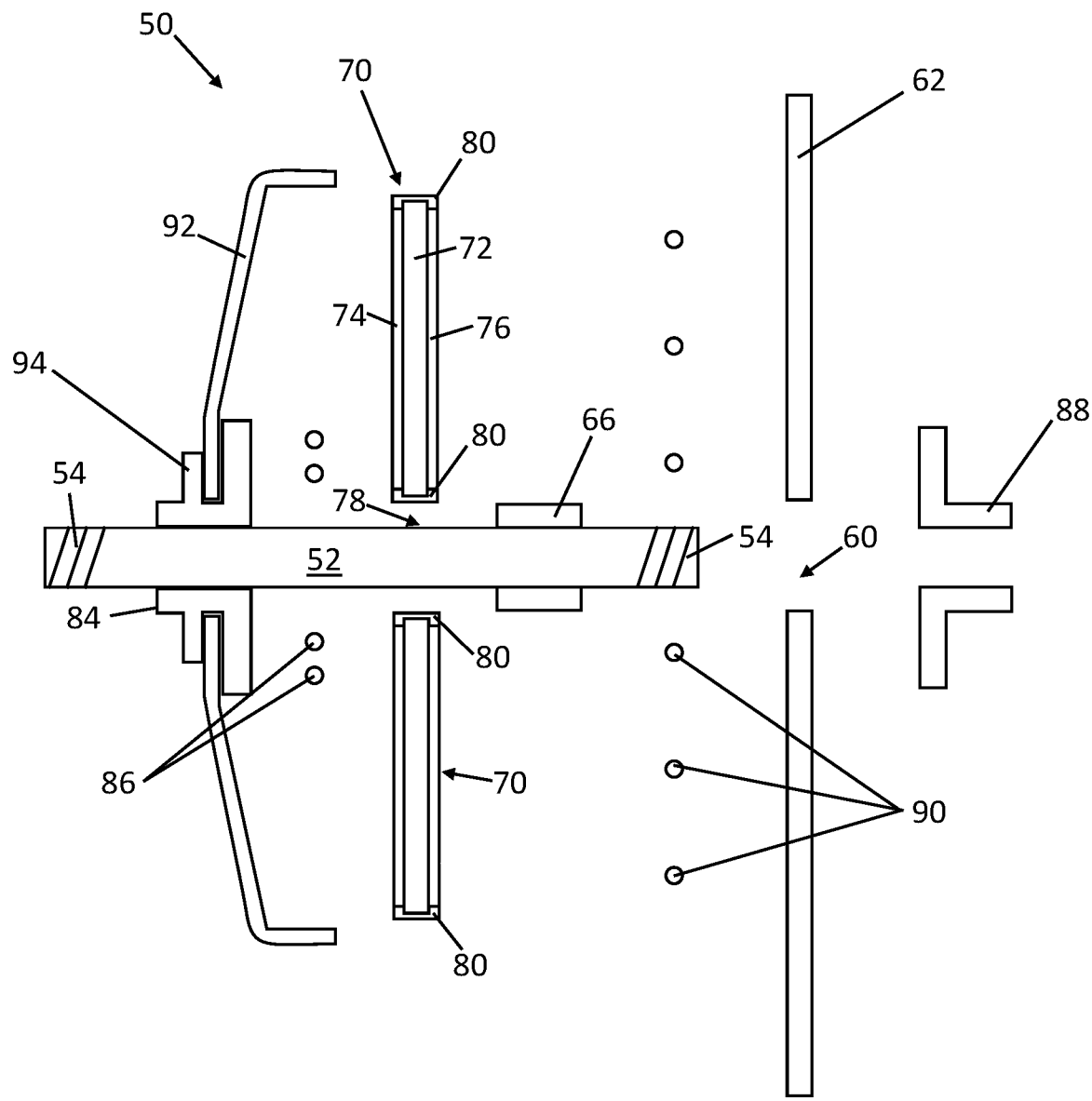
FIG. 3 is a schematic exploded cross-sectional view of the varistor of FIG. 2.

Referring to FIGS. 2 and 3 of the drawings, a feed-through varistor 50 without a thermally-activated override comprises a feed-through conductor 52 formed as a metal rod with screw-threaded ends 54 to which input 56 and output 58 conductors are affixed, in use. The input conductor 56 is connected to an incoming power supply, whereas the output conductor 58 is connected to the power input of a device or circuit (not shown) to be protected by the varistor 50. Under normal operating conditions, electrical current flows through the feed-through conductor 52, substantially uninhibited, between the terminals 54.

The feed-through conductor 52 is arranged to extend through an aperture 60 in a metal side wall 62 of the device to be protected. The metal side wall 62 is grounded 64 in the usual way, and the metal side wall 62 is electrically insulated by a dielectric bush 66 that is interposed between the feed-through conductor 52 and the periphery of the aperture 60 in the metal side wall 62. Thus, there is no direct electrical connection between the feed-through conductor 52 and the grounded metal side wall 62.

A varistor disc assembly 70 is also provided, which comprises a disc 72 of material, exhibiting the requisite dielectric-conductor property previously described, sandwiched between a pair of metal contact plates 74, 76. The varistor disc assembly 70 has a through hole 78 in the middle of it, through which the feed-through conductor 52 extends. The metal contact plates 74, 76 are electrically insulated from one another around their outer peripheries, and around the through hole 78 by 1) their outer diameters being smaller than that of the varistor disc 72; 2) the diameter of the through holes in the metal discs 74, 76 being larger than that of the varistor disc 72; and 3) by annular dielectric parts 80 extending around the outer periphery of the varistor disc assembly, and around the interior of the central hole 78.

A first one of the metal contact plates 74 is electrically connected to the feed-through conductor 52 by a metal locking ring 84, which screws tight against the varistor disc assembly 70, sandwiching a set of resiliently deformable annular contact rings 86 (e.g. made from metal mesh) between the locking ring 84 and the first metal contact plate 74 of the varistor disc assembly 70. This forms a permanent electrical connection between the feed-through conductor 52 and the first metal contact plate 74. In other embodiments (not shown), the first metal contact plate 74 is soldered or brazed to, or formed integrally with, the locking ring 84, to form the aforesaid permanent electrical connection.

The metal locking ring 84 bears against a dielectric locking ring 88 located on the opposite side of the varistor disc assembly 70. The dielectric locking ring 88 clamps the metal side wall 62 against a back plate 89 (not shown in the remaining drawings for clarity) which bears against the second metal disc 76 of the varistor disc assembly 70 with a second set of resiliently deformable annular contact rings 90 (e.g. made from metal mesh). This configuration forms a permanent electrical connection (in normal use) between the second metal disc 76 of the varistor disc assembly 70 and ground 64.

A protective casing 92 is also provided to enclose the varistor disc assembly 70 and this is held in place by a locking ring portion 94 of the metal locking ring 84. The interior of the casing 92 is filled with potting material to environmentally protect the varistor disc, provide good insulation distances over surfaces, particularly the input side which could see high transient voltages and must not flashover.

Figure 4:
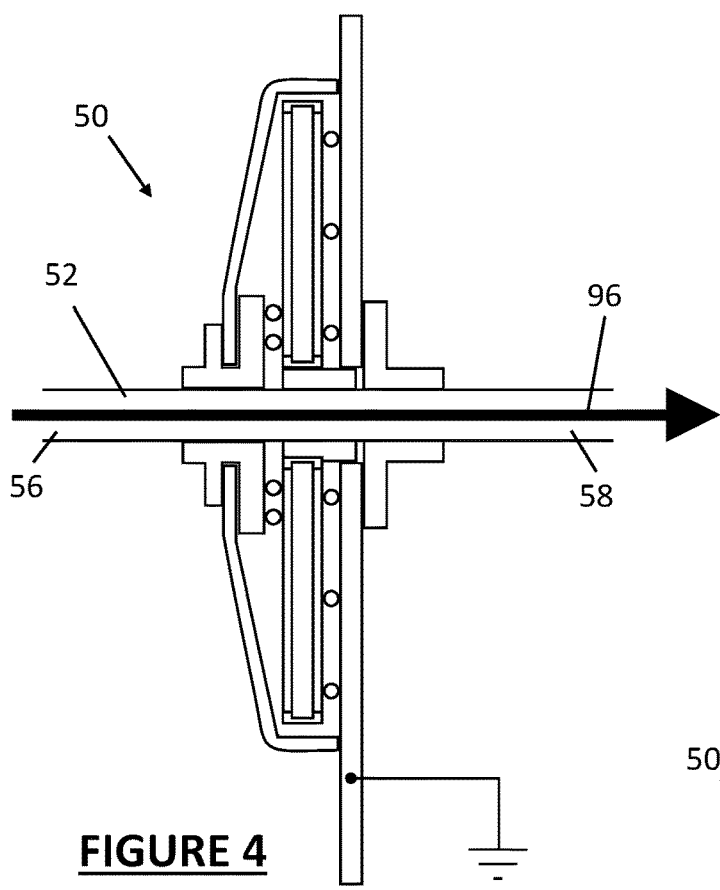
FIG. 4 is a schematic diagram showing the current flow path of the varistor of FIG. 2 in a normal operational state.
Figure 5:
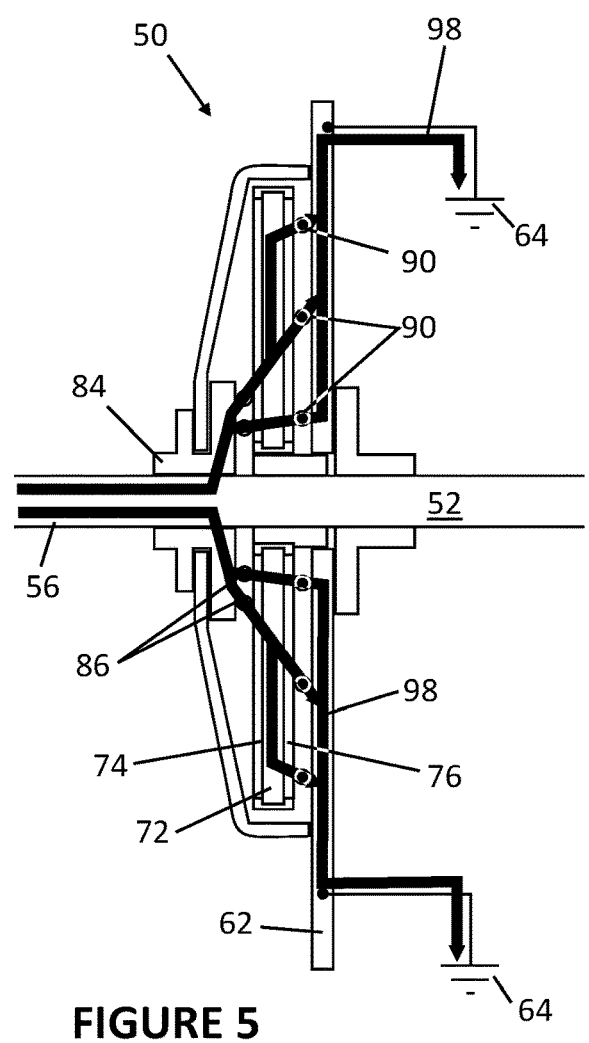
FIG. 5 is a schematic diagram showing the current flow path of the varistor of FIG. 2 during an EMP or transient pulse event.

The operation of the varistor 50 is shown schematically in FIGS. 4 and 5 of the drawings. In normal operation, i.e. when the input voltage is within design parameters and lower than the dielectric breakdown potential of the varistor disc 72, current 96 flows directly through the feed-through conductor, as indicated schematically in FIG. 4 of the drawings. However, during an EMP event, that is to say, when the input voltage at the input terminal 56 exceeds the dielectric breakdown potential of the varistor disc 72, the varistor disc 72 becomes electrically conductive, thus forming a current path between the first 74 and second 76 metal plates of the varistor disc assembly 70. In this situation, as shown in FIG. 5 of the drawings, the current 98 flows from the input terminal 56 through the metal locking ring 84, through the first set of annular contact rings 86, through the first metal contact plate 74, through the varistor disc 72, through the second metal contact plate 76, through the second set of annular contact rings 90, into the metal ground side wall 62 of the housing, and then to ground 64, thus shorting the EMP and protecting the output terminal 58 of the varistor 50 from the electromagnetic pulse.

It will be noted that there are no fly leads connecting the components and that the varistor disc assembly is permanently connected between the input terminal 56 and ground 64. Further, because the input 56 and output 58 terminals are located on opposite sides of a grounded earth plane 62, RF transmission between the input 56 and output 58 terminals is vastly reduced, or eliminated. Furthermore, because the feed-through conductor 52 is precisely that, a direct conductor passing through the varistor disc assembly 70, its inductance is very low, thus improving the reaction time of the varistor 50 compared with known varistors.

The foregoing description explains the main components of a feed-though varistor of the general type of the invention, but without a thermally-activated override, which thermally-activated override (as shall be explained below with reference to FIGS. 10 to 13) can be added to form a varistor in accordance with the invention.

Figure 6:
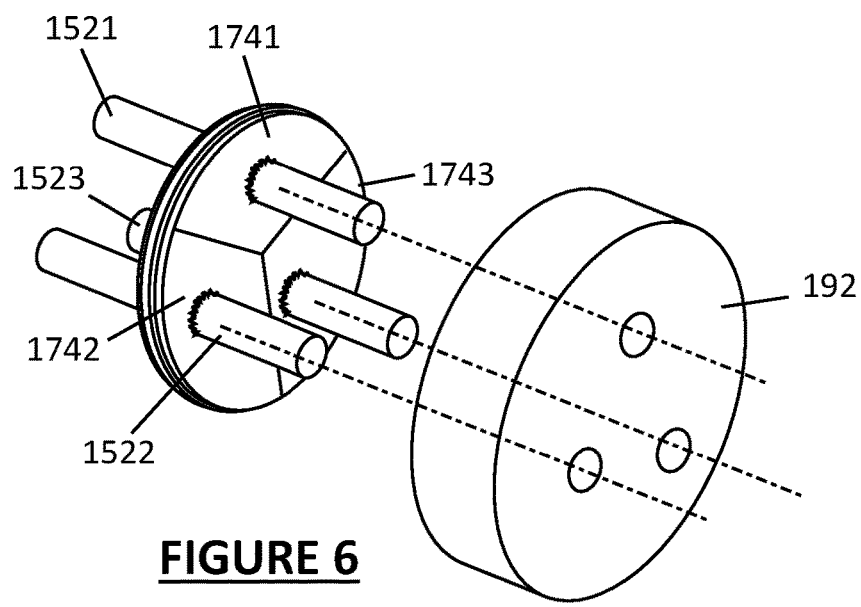
FIG. 6 is a schematic perspective exploded view of an embodiment of a varistor without a thermally-activated override with multiple feedthrough connections.
Figure 7:
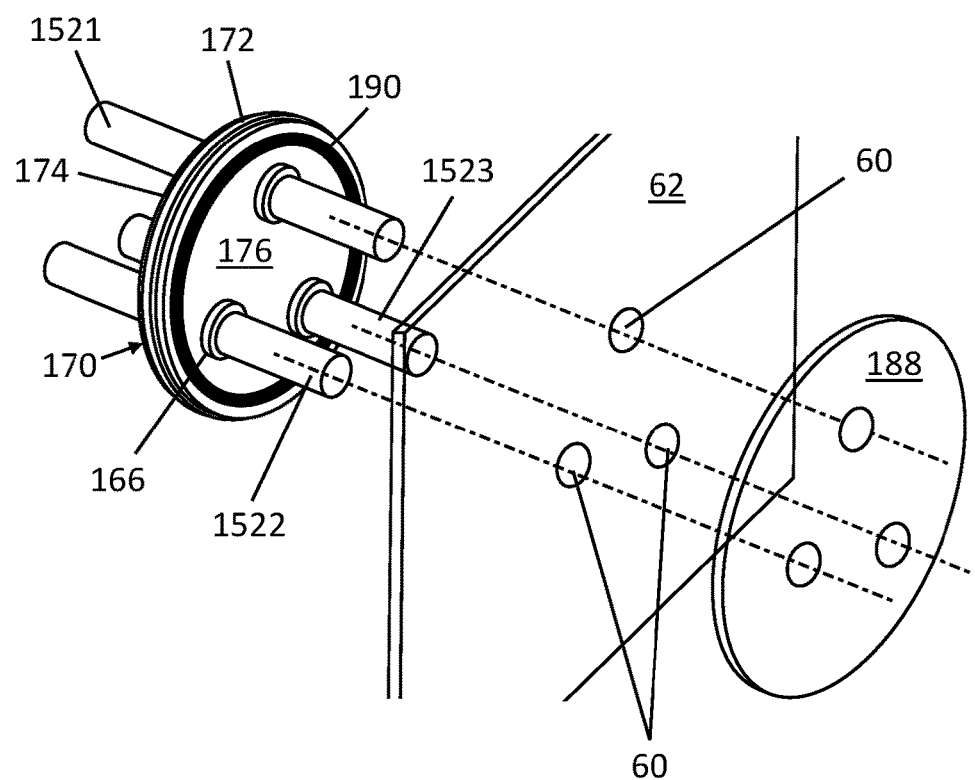
FIG. 7 is a schematic perspective exploded view of the varistor of FIG. 6 viewed from the opposite side.

An alternative embodiment of the varistor described above (again without a thermally-activated override illustrated) is shown in FIGS. 6 and 7 of the drawings, in which a varistor 100 comprises three feed-through conductors 1521, 1522, 1523 sharing a common varistor disc assembly 170. Each of the feed-through conductors 1521, 1522, 1523 extends through its own through hole (not visible) in the varistor disc assembly 170. As before, the varistor disc assembly 170 comprises a varistor disc 172 sandwiched between a pair of conductor plates 174, 176. In this case, the first conductor plate 174 is formed from three pieces 1741, 1742, 1743 corresponding to each of the feed-through conductors 1521, 1522, 1523, which pieces are electrically insulated from one another. Each of the feed-through conductors 1521, 1522, 1523 are brazed to their respective first conductor plate portions 1741, 1742, 1743 to form a permanent electrical connection therebetween.

FIGS. 6 & 7 show an example of three feedthrough conductors, in which all of the terminals are "live" terminals. In practice, however, if one of the three conductors were an "earth", then the electrode configuration would be similar to that depicted in FIGS. 14 & 15 hereinbelow.

The second conductor plate 176 is permanently electrically connected to a grounded earth plane 62 via a resiliently deformable conductor ring 190, and dielectric bushes 166 as described previously, are used to insulate the second conductor plate 176 from the pass through conductors 1521, 1522, 1523. A clamping disc 188 bears against a cover 192 as previously described to clamp/hold the whole assembly together.

Figure 8:
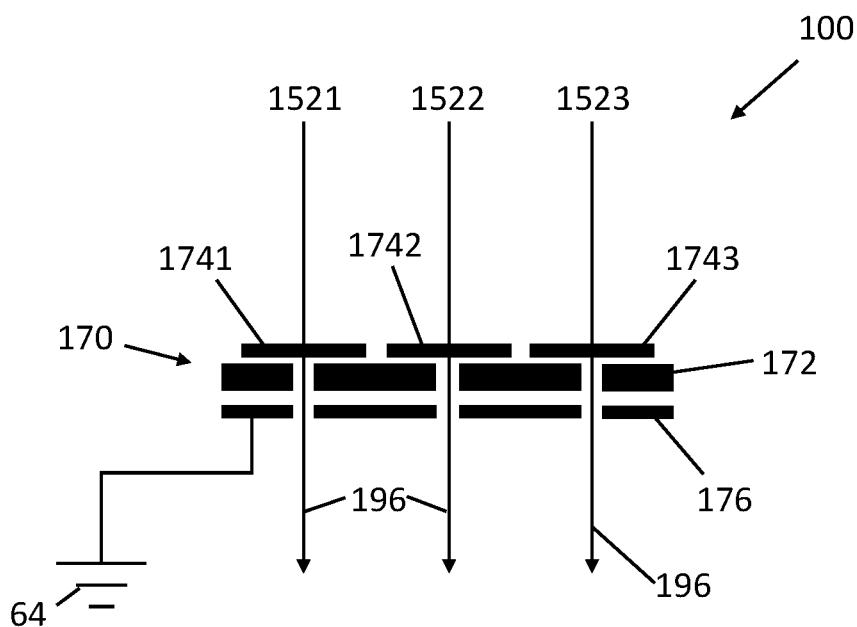
FIG. 8 is a schematic diagram showing the current flow path of the varistor of FIGS. 6 and 7 in a normal operational state.
Figure 9:
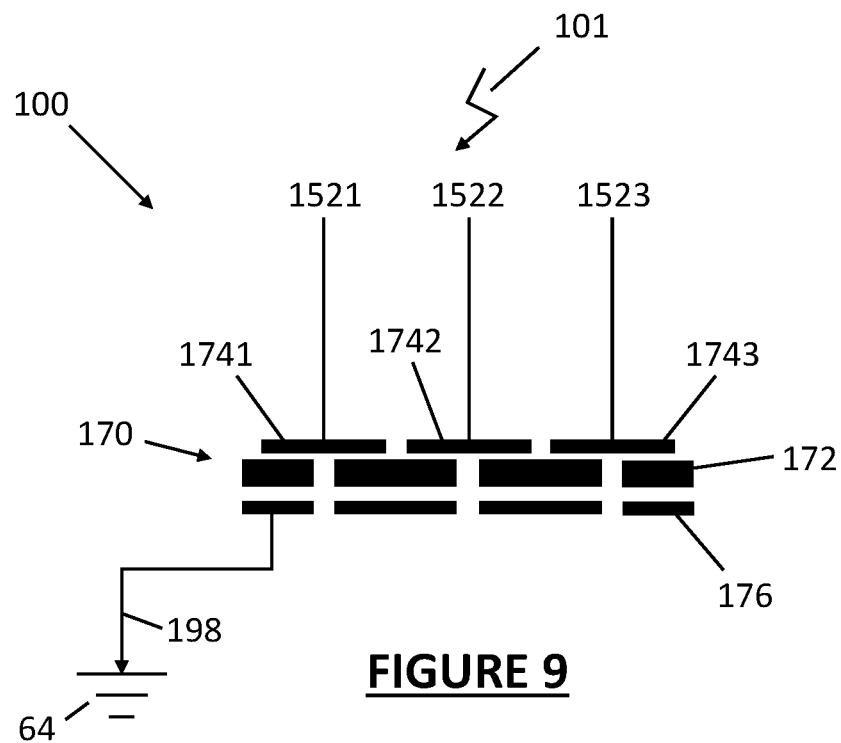
FIG. 9 is a schematic diagram showing the current flow path of the varistor of FIGS. 6 and 7 during an EMP or transient pulse event.

The operation of the varistor 100 of FIGS. 6 and 7 is shown schematically in FIGS. 8 and 9 of the drawings. In FIG. 8, the varistor 100 is in normal operation, i.e. when the input voltage is within design parameters and lower than the dielectric breakdown potential of the varistor disc 172, current 196 flows directly through each of the feed-through conductors 1521, 1522, 1523, as indicated schematically in FIG. 8. However, during an EMP event 101, that is to say, when the input voltage at any one of the input terminals exceeds the dielectric breakdown potential of the varistor disc 172, the whole varistor disc 172 becomes electrically conductive, thus forming a current flow path between the each of the first varistor disc portions 1741, 1742, 1743 and the second conductor plate 176. In this situation, as shown in FIG. 9 of the drawings, the current 198 flows from the input terminals to ground 64. Thus, the configuration shown in FIGS. 6 to 9 of the drawings provides simultaneous protection for any conductor in the event of an EMP event 101 on any of the conductors. This configuration may be of use, for example, in protecting a three-phase power supply, with the L1, L2 and L3 inputs being connected respectively to feed-through conductors 1521, 1522, 1523. Of course, where this type of protection is not needed, it would be possible to use several varistors 50 as described in relation to FIGS. 2 to 5 above, albeit with a separate varistor 50 on each of the L1, L2 and L3 phases.

Embodiments of the invention comprising thermally-activated disconnects are shown in FIGS. 10 to 13 of the drawings, and are largely the same as the embodiment shown in FIG. 2 of the drawings. Identical reference signs have been used, therefore, to identify identical features, to avoid unnecessary repetition.

Figure 10:
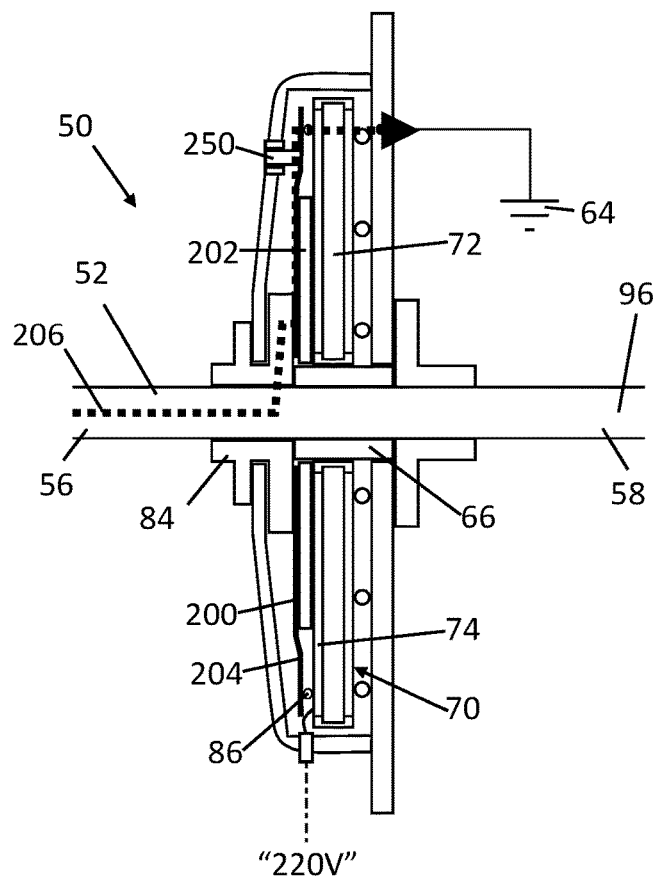
FIGS. 10 and 11 are schematic cross-sections of an embodiment of a varistor in accordance with the invention, comprising a first type of thermally-actuated disconnect and a test terminal, in normal, and permanent disconnect modes, respectively.
Figure 11:
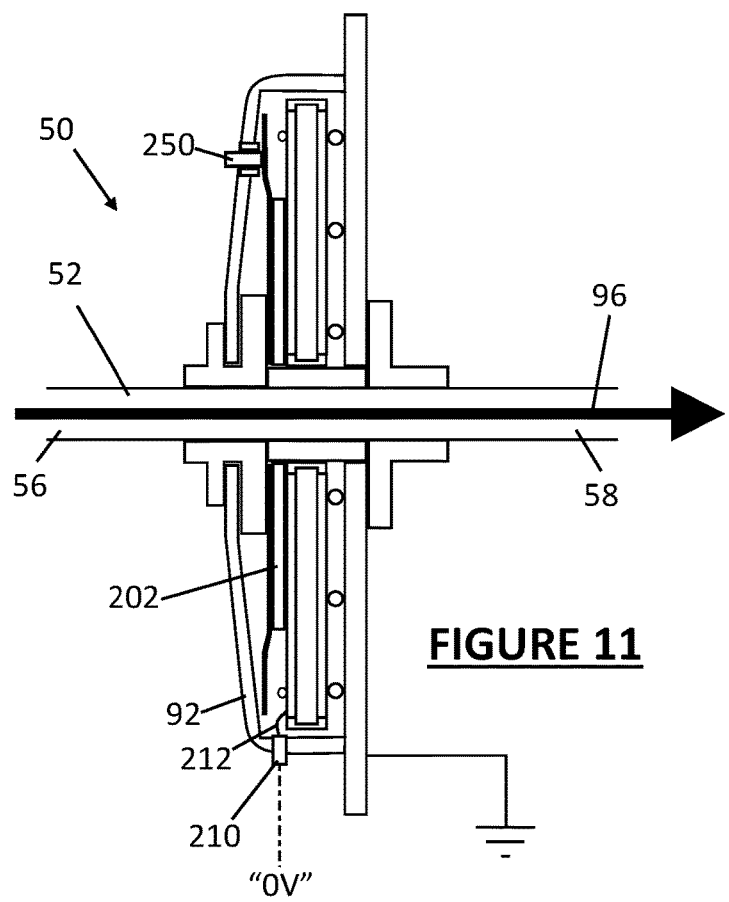

Referring to FIGS. 10 and 11 of the drawings, a varistor 50 in accordance with the invention comprises a feed-through conductor 52 having input 56 and output 58 ends as previously described. A conductive bush 84 connects the feed-through conductor to a bimetallic, or one-way shape-memory alloy disc 200, which is electrically insulated from the feed-through conductor 52 by the insulator tube 66 previously described, and is spaced apart from the input conductor disc 74 of the varistor disc 70 by an annular insulator disc 202, leaving a peripheral edge portion 204 extending outwardly beyond the annular insulator disc 202. The bimetallic, or one-way shape-memory alloy disc 200 may be tinned or coated in some way to improve its electrical conductivity.

Bimetallic discs are widely used in commercial thermostats (e.g. for electric kettles or hair dryers), and most use conical snap action discs (without a hole in the middle). However, the operation of these is always to actuate a spring contact which joins two discrete contacts. This of course would introduce an inductive connection and would defeat the benefit of the invention. In aspects of the invention, a conical disc as part of the connection path has been deliberately selected from amongst other alternatives, to provide a 360-degree co-axial connection to the varistor disc, which suitably gives a substantially non-inductive connection when the varistor is in-service. In other words, the conical discoidal form of the bimetallic disc permits a 360-degree co-axial connection to the varistor disc thus preserving its low inductance connection. In comparison, traditional two-terminal thermal disconnect devices would introduce inductance which would reduce the operating speed of the varistor.

The peripheral edge portion 204 of the bimetallic, or one-way shape-memory alloy disc 200 connects, in normal use, as shown in FIG. 10, to the input conductor disc 74 of the varistor disc 70 via a conductive ring 86, and thus electrical current, in an over-voltage situation (as shown in FIG. 10) is able to be grounded to earth 64 as indicated schematically by arrow 206.

Over time, the varistor disc 72 may degrade, leading to it having a finite resistance at low voltages, which causes it to heat up by resistive heating—the varistor disc 72 being permanently connected to the mains supply voltage and ground. Upon heating, as shown in FIG. 11 of the drawings, the bimetallic, or one-way shape-memory alloy disc 200 "snaps" into a second shape, in which the peripheral edge portion 204 of the bimetallic, or one-way shape-memory alloy disc 200 moves away from the conductive ring 86, thus breaking the connection between the varistor disc 70 and the input power supply. Now, of course, the over-voltage protection provided by the invention is removed (as shown by arrow 208 in FIG. 11), but at the same time, the input mains power is not being permanently shorted to ground 64 via the now-failed varistor disc 72.

However, the varistor 50 of the invention is provided with a test terminal 210 in the casing 92, which is connected via a fly lead 212 to the live side 74 of the varistor disc 72. Thus, as can be seen by comparing FIGS. 10 and 11, the voltage signal at the test terminal 210 goes from mains voltage (e.g. 220V, in this example) in FIG. 10, to 0V. Thus, if a remote monitoring system (not shown) in connected to the test terminal 210, it is possible to monitor the status of the varistor 50, and therefore it is possible to determine, without having to disassemble and test the varistor 50, whether the varistor disc 70 is operation or not.

A further possible addition comprises a mechanical indicator and/or push-button reset, which comprises an insulative pin 250 extending through the housing and in contact with the bimetallic, or one-way shape-memory alloy disc 200. In the normal state, as shown in FIG. 10, the pin 250 is retracted within the housing, but once the bimetallic, or one-way shape-memory alloy disc 200 has "snapped" to its second shape, as shown in FIG. 11, the pin projects from the housing, this providing a visual indication of the status of the varistor. The pin 250 can be depressed, if required, to reset the bimetallic disc 200.

Figure 12:
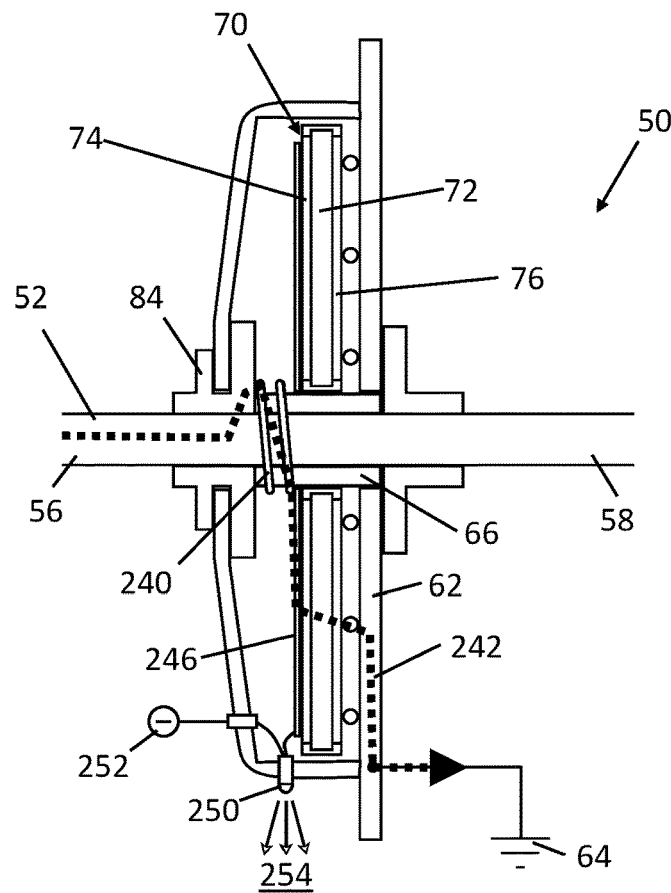
FIGS. 12 and 13 are schematic cross-sections of another embodiment of a varistor in accordance with the invention, comprising a second type of thermally-actuated disconnect and a status indicator, in normal, and permanent disconnect modes, respectively.
Figure 13:
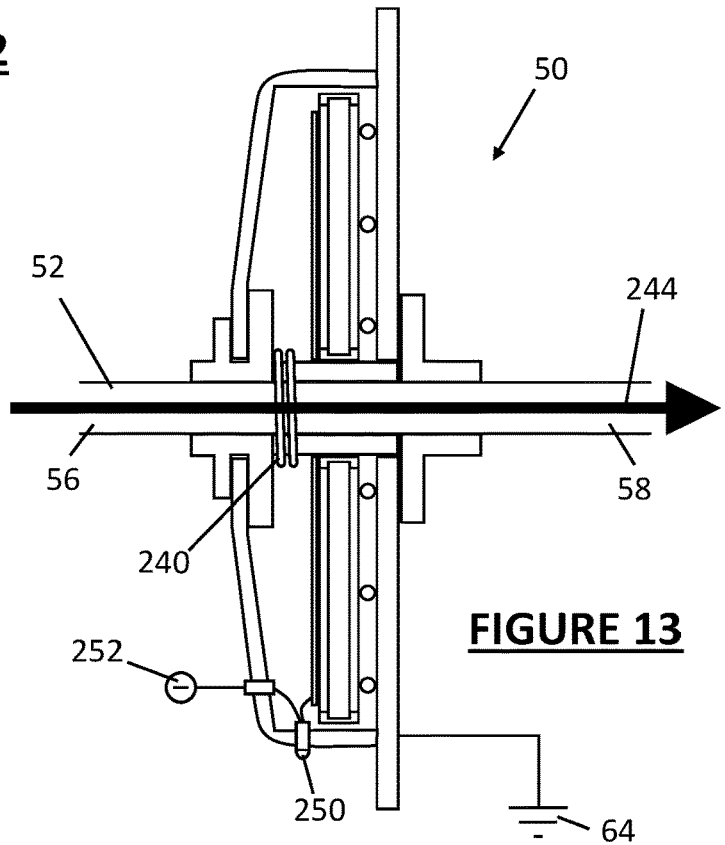

FIGS. 12 and 13 of the drawings illustrate another example of the invention fitted with a thermally-actuated disconnect. In FIGS. 12 and 13 of the drawings, a varistor 50 in accordance with the invention comprises a feed-through conductor 52 having input 56 and output 58 ends as previously described. A conductive bush 84 connects the feed-through conductor to a helical spring 240 manufactured of a shape-memory alloy, such as from a Ni—Ti alloy. The shape-memory spring 240 has a one-way shape memory effect, and is thus formed above its transition temperature, in the shorter form, as shown in FIG. 13 of the drawings. It is then held in that shorter form, and allowed to cool below its transition temperature, whereupon the shape-memory spring 240 is then deformed (elongated) to the longer form shown in FIG. 12 of the drawings. The result is now that below the transition temperature (which transition temperature is, of course, selected to correspond to a varistor disc temperature that indicates the onset of failure) the shape-memory spring adopts the longer form shown in FIG. 12 of the drawings. However, when the varistor disc 70 begins to fail, and hence heats up, in normal use due to resistive hearting, so too does the shape-memory spring 240. Eventually, the temperature of the shape-memory spring 240 may exceed the shape-memory transition temperature, causing it to adopt the shorter form, shown in FIG. 13 of the drawings, thus disconnecting the varistor disc 70 from the circuit. Due to the absence of a voltage across the varistor disc 70, and hence the absence of further resistive heating, the varistor disc 72 will now eventually cool. However, because the shape-memory spring 240 has a one-way shape-memory, it will not revert to its longer form, thus permanently disconnecting the varistor disc 72 from the circuit.

Due to the inductance of the helical spring, this example is more suitable for lower frequency applications such as lighting suppression. Other shapes of shape memory alloy, such as discs or blocks, may be more suitable for higher frequency applications such as EMP and IEMI.

For the sake of completeness, the current flow path, during a power spike, is illustrated in FIGS. 12 and 13 of the drawings by arrows 242 and 244. In FIG. 12, the varistor disc 72 is fully operational, and current is diverted to ground through the conductive bush 84, the shape-memory spring 240 and a conductor plate 246, through the varistor disc 70 and to ground 64, via the casing 62. However, once the varistor disc 70 has failed (heated above the shape-memory alloy's transition temperature), as shown in FIG. 13 of the drawings, the shape-memory spring 240 has shortened, thus disconnecting the varistor disc assembly 70 from the circuit and preventing a permanent connection to ground.

As described previously, the over-voltage protection provided by the invention is removed (as shown by arrow 244 in FIG. 13), but at the same time, the input mains power is not being permanently shorted to ground 64 via the now-failed varistor disc 72.

However, the varistor 50 of the invention is provided with an indicator light 250 in the casing 92, which is connected via a fly lead 212 to the live side 74 of the varistor disc 72 and to a common, or negative connection 252. The common connection can alternatively be connected to the earth (ground) side of the varistor housing to avoid the need for a separate external connection. Thus, as can be seen by comparing FIGS. 12 and 13, the indicator light is illuminated 254 during normal operation, or extinguished once the varistor disc 72 has failed. Thus, it is possible to visually monitor the status of the varistor 50, and therefore it is possible to determine, without having to disassemble and test the varistor 50, whether the varistor disc 70 is operation or not.

Figure 14:
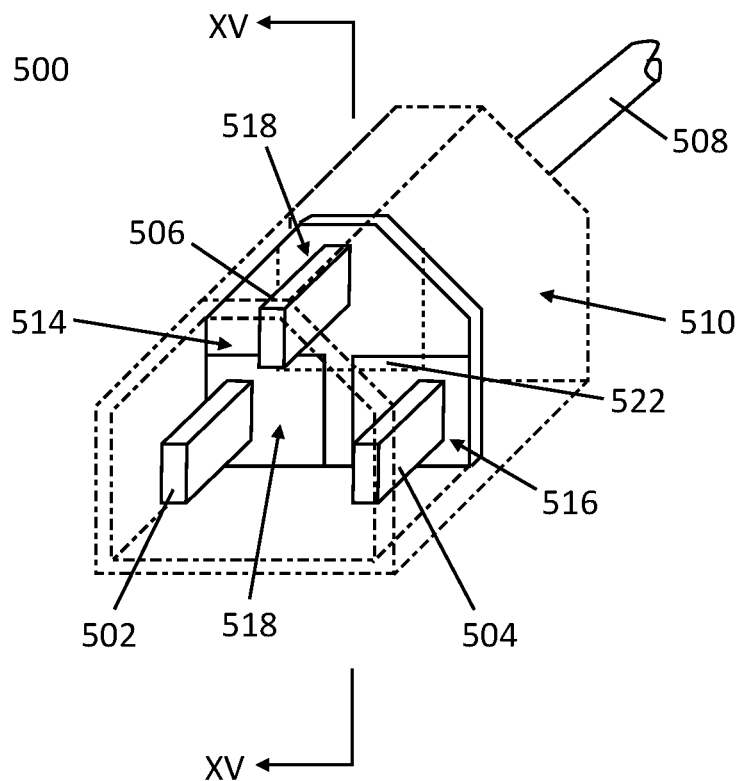
FIG. 14 is a schematic perspective view of a terminal/plug incorporating a varistor.
Figure 15:
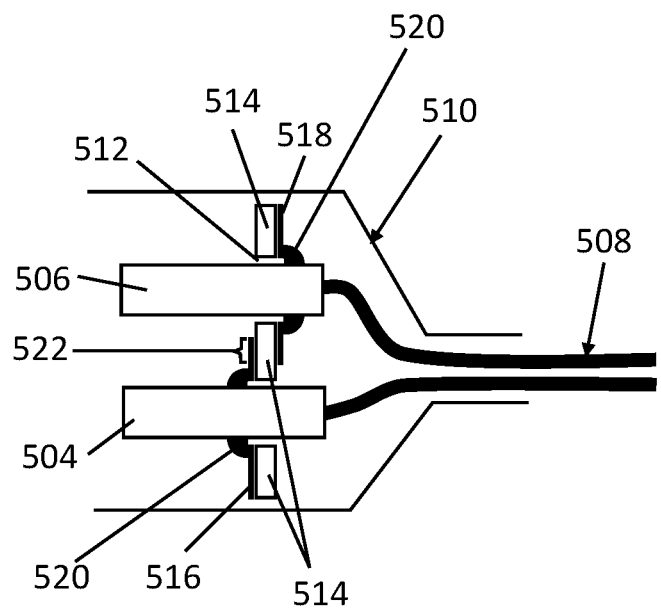
FIG. 15 is a schematic partial cross-section of the terminal/plug of FIG. 14 on XV-XV.

A further embodiment of the invention (albeit without a permanent disconnect function, although this could be added) is shown in FIGS. 14 and 15 of the drawings. In this embodiment, the invention is applied to a plug arrangement, such as a UK-type three-pin mains plug, an IEC-type "kettle plug" etc. The plug 500 has three pins for live 502, neutral 504 and earth 506 conductors of a cable 508, respectively. The plug 500 also has an insulative casing 510.

The pins 502, 504, 506 all extend through respective through apertures 512 in a varistor plate 514, whose outer shape is configured to fit within the housing 510. A first side of the varistor plate 514 is tinned 516, 518 in the regions surrounding the live 504 and neutral 506 pins, whereas the opposite side of the varistor plate 514 is tinned 520 in the region surrounding the earth pin 506. Each pin 502, 504, 506 is electrically connected, (e.g. by soldering 522) to its respective tinned area 516, 518, 520. Now, in normal use, the varistor plate 514 is electrically insulative, and so is invisible to the pins. However, if a high-voltage pulse arrives on the circuit, varistor disc 512 will become conductive, thus shorting the pulse to the earth pin 506, and hence to ground. It will be noted that the tinned regions on the first side of the varistor plate 512 slightly overlap, in an overlap region 522, with the tinned regions on the opposite side of the varistor plate 512, and this is to provide as short as possible a conduction pathway through the varistor plate 512. Of course, a permanent disconnect device, such as that described previously could be fitted, but this is optional.

The following statements are not the claims, but relate to various possible aspects and/or features of the invention:

Statement 1. A varistor comprising: a feed-through conductor and a varistor disc interposed between, and electrically connected to, conductor layers disposed on opposite surfaces of the varistor disc, the conductor layers being electrically isolated from one another; wherein the varistor disc comprises a through aperture through which the feed-through conductor extends, and wherein a first one of the conductor layers is electrically connected to the feed-through conductor, and wherein a second one of the conductor layers is, in normal use, permanently electrically connected to ground.

Statement 2. The varistor of claim 1, wherein the varistor disc comprises a sheet of material that is substantially dielectric at low (normal operating) voltages, but which is substantially conductive at high voltages.

Statement 3. The varistor of statement 2, wherein the low voltage is a designed for normal operating voltage of a connected device.

Statement 4. The varistor of statement 3, wherein the low (normal operating) voltage is substantially any one or more of the group comprising: less than 500V; 480 VAC, 277 VAC, 275 VAC, 250 VAC, 230 VAC, 220 VAC; 120 VAC, 95 VAC; 250 VDC, 100 VDC, 48 VDC, 28 VDC, 24 VDC.

Statement 5. The varistor of any of statements 2 to 4, wherein the high voltage corresponds to that of an electromagnetic pulse or IEMI pulse.

Statement 6. The varistor of statement 5, wherein the high voltage is substantially between 1 kV and 300 kV.

Statement 7. The varistor of any preceding statement, comprising input and output terminals at opposite ends of the feed-through conductor, which terminals are electrically connectable, in use, to an incoming power supply or signal line and to the power or signal input of a device to be protected, respectively.

Statement 8. The varistor of any preceding statement, wherein the feed-through conductor comprises a metal rod that extends through an aperture in the varistor disc.

Statement 9. The varistor of any preceding statement, wherein the conductor layers comprise any one or more of the group comprising: a metal surface coating layer deposited onto the varistor disc; a metal disc adhered to the varistor disc; a metal disc brazed to the varistor disc; a metal disc soldered to the varistor disc; and a metal disc clamped to the varistor disc so as to form an electrical connection thereto.

Statement 10. The varistor of any preceding statement, wherein the varistor disc is substantially circular.

Statement 11. The varistor of any preceding statement, wherein the feed-through conductor extends through a central through aperture in the varistor disc.

Statement 12. The varistor of any preceding statement, wherein the conductor layers are electrically isolated from one another when the varistor disc is in its dielectric state.

Statement 13. The varistor of statement 12, wherein the dimensions of the conductor layers are different to those of varistor disc to form a peripheral gap around the edges of the varistor disc.

Statement 14. The varistor of statement 12 or statement 13, comprising an insulating rim around a periphery of the varistor disc and/or around the periphery of the through hole.

Statement 15. The varistor of any preceding statement, wherein the first conductor layer is electrically connected to the feed-through conductor via a direct connection between the first conductor layer and the feed-through conductor, or via an intermediate flexible metal component to minimise thermal mismatch Statement 16. The varistor of statement 15, wherein the connection method comprises soldering or brazing.

Statement 17. The varistor of statement 15, wherein the connection method comprises a conductive bush or gasket mechanically and electrically coupling the feed-through conductor to the first conductor layer.

Statement 18. The varistor of any preceding statement, wherein the second conductor layer is permanently electrically connected, in use, to ground via a direct connection between the first conductor layer and ground.

Statement 19. The varistor of statement 18, wherein the connection method comprises one or more electrodes positioned on the second conductor layer, wherein electrodes can be pressed into electrical engagement with a grounded conductive surface.

Statement 20. The varistor of any preceding statement, wherein the disc assembly is arranged substantially perpendicular to a longitudinal axis of the feed-through conductor.

Statement 21. The varistor of statement 20, wherein the input and output ends of the feed-through conductor are located on opposite sides of the varistor disc, and when used in conjunction with a ground plane of a device to be protected, the input and output ends of the feed-through conductor are located on opposite sides of the ground plane.

Statement 22. The varistor of any preceding statement, further comprising a casing enclosing the varistor disc assembly.

Statement 23. The varistor of any preceding statement, comprising a plurality of feed-through conductors and a corresponding plurality of through apertures in the varistor disc assembly.

Statement 24. The varistor of statement 23, wherein the first conductor plate comprises a corresponding number of first conductor portions, the first conductor portions being electrically insulated from one another.

Statement 25. The varistor of any preceding statement further comprising a thermally-activated override adapted, in use, to permanently disconnect the varistor disc from the circuit once the temperature of the varistor disc has exceeded a predetermined temperature.

Statement 26. The varistor of statement 25, wherein the thermally-activated override is a one-way thermally-activated override.

Statement 27. The varistor of statement 25 or statement 26, wherein the thermally-activated override comprises a bimetallic disc electrically connected in-series between the varistor disc and ground, the bimetallic disc being configured to undergo a one-way shape change upon heating so as to form an electrical connection between the varistor disc and ground below the predetermined temperature, but to permanently disconnect the varistor disc from ground if the varistor disc is heated to, or above, the predetermined temperature.

Statement 28. The varistor of statement 27, wherein the bimetallic disc is any one or more of the group comprising: part-spherical; conical; and ridged.

Statement 29. The varistor of statement 28, wherein the bimetallic disc is configured, in use, to snap from its first shape to its second shape upon heating above the predetermined temperature, and to remain snapped in the second shape regardless of subsequent cooling.

Statement 30. The varistor of any of statements 25 to 29, wherein the thermally-activated override comprises a one-way shape memory alloy element electrically connected in-series between the varistor disc and ground.

Statement 31. The varistor of statement 30, wherein the one-way shape memory alloy element is configured to undergo a one-way shape change upon heating.

Statement 32. The varistor of statement 30 of statement 31, wherein the shape-memory alloy comprises a helical spring.

Statement 33. The varistor of statement 32, wherein the spring is formed above its shape-memory transition temperature in a first, relatively short form; held in its short form and allowed to cool below its shape-memory transition temperature, and then elongated to a longer form.

Statement 34. The varistor of any of statements 30 to 33, wherein the shape-memory transition temperature is selected to substantially correspond to the predetermined temperature.

Statement 35. The varistor of any of statements 25 to 34, further comprising a test terminal electrically connected to the live side of the varistor disc.

Statement 36. The varistor of statement 35, further comprising a sensing circuit operatively connected to the test terminal.

Statement 37. The varistor of any of statements 25 to 36, further comprising an indicator light operatively connected between the live side of the varistor disc and a neutral or earth side of the varistor.

Statement 38. The varistor of statement 37, further comprising a protection circuit for protecting the indicator light from EMP or other high voltage pulses.

Statement 39. A plug comprising a varistor according to any preceding statement.

Statement 40. The plug of statement 39, wherein the plug comprises two or more pins, a first pin being a live or neutral pin and the another pin being an earth pin, the pins extending through respective through apertures the varistor disc, and wherein a first side of the varistor disc is tinned in a region surrounding a first one of the pins, and wherein an opposite side of the varistor disc is tinned in a region surrounding the earth pin, the pins being electrically connected to their respective tinned areas.

Statement 41. The plug of statement 40, wherein the tinned region or regions on a first side of the varistor disc overlap with a tinned region or regions on the opposite side of the varistor disc.

Statement 42. A varistor substantially as hereinbefore described, with reference to, and as illustrated in, FIGS. 2 to 13 of the accompanying drawings.

The invention is not restricted to any particular specific details of the foregoing embodiments, which are exemplary.

The invention claimed is:

1. A varistor (50) comprising: a feed-through conductor (52) comprising input (56) and output (58) terminals at opposite ends thereof (52), which terminals (56, 58) are electrically connectable, in use, to an incoming power supply or signal line and to a power or signal input of a device to be protected, respectively; and a varistor disc (72) interposed between, and electrically connected to, conductor layers disposed on opposite surfaces of the varistor disc (72), the conductor layers being electrically isolated from one another; wherein
the varistor disc (72) comprises a through aperture (60) through which the feed-through conductor (52) extends;
a first one of the conductor layers is electrically connected to the feed-through conductor (52); and
a second one of the conductor layers is, in normal use, permanently electrically connected to ground (64);
the varistor (50) further comprising: a thermally-activated override adapted, in use, to disconnect the varistor disc (72) from the feed-through conductor (52) once the temperature of the varistor disc (72) has exceeded a predetermined temperature,
and further wherein the varistor disc (72) comprises a sheet of material that is substantially dielectric at low or normal operating voltages, but which is substantially conductive at high voltages, the low voltage being designed for normal operating voltage of a connected device, the said low (normal operating) voltage being substantially any one or more of the group comprising: less than 500V; 480 VAC, 277 VAC, 275 VAC, 250 VAC, 230 VAC, 220 VAC, 120 VAC, 95 VAC, 250 VDC, 100 VDC, 48 VDC, 28 VDC, 24 VDC, and wherein the high voltage corresponds to that of an electromagnetic pulse or IEMI pulse, the high voltage being substantially between 1 kV and 300 kV.

2. The varistor (50) of claim 1, wherein the thermally-activated override is a one-way thermally-activated override.

3. The varistor (50) of claim 1, wherein the thermally-activated override comprises a bimetallic disc electrically connected in-series between the varistor disc (72) and ground (64), the bimetallic disc being configured to undergo a one-way shape change upon heating so as to form an electrical connection between the varistor disc (72) and ground (64) below the predetermined temperature, but to disconnect the varistor disc (72) from ground (64) if the varistor disc (72) is heated to, or above, the predetermined temperature; the bimetallic disc being:

any one or more of the group comprising: part-spherical; conical; and ridged; and being configured, in use, to snap from its first shape to its second shape upon heating above the predetermined temperature, and to remain snapped in the second shape regardless of subsequent cooling.

4. The varistor (50) of claim 1, wherein the thermally-activated override comprises a one-way shape memory alloy element (200) electrically connected in-series between the varistor disc (72) and ground (64), the one-way shape memory alloy element (200) being configured to undergo a one-way shape change upon heating.

5. The varistor (50) of claim 4, wherein the shape-memory alloy (200) comprises a helical spring (240), which is formed above its shape-memory transition temperature in a first, relatively short form; held in its short form and allowed to cool below its shape-memory transition temperature, and then elongated to a longer form, the shape-memory transition temperature being selected to substantially correspond to the predetermined temperature.

6. The varistor (50) of claim 4, further comprising any one or more of the group comprising: a test terminal (210) electrically connected to the live side of the varistor disc (72); a sensing circuit operatively connected to the test terminal (210); an indicator light (250) operatively connected between the live side (74) of the varistor disc (72) and a neutral or earth side of the varistor (50); and a protection circuit for protecting an indicator light (250) from EMP or other high voltage pulses.

7. The varistor (50) of claim 1, wherein the feed-through conductor (52) comprises a metal rod (54) that extends through an aperture (60) in the varistor disc (72).

8. The varistor (50) of claim 1, wherein the conductor layers comprise any one or more of the group comprising: a metal surface coating layer deposited onto the varistor disc (72); a metal disc adhered to the varistor disc (72); a metal disc brazed to the varistor disc; a metal disc soldered to the varistor disc (72); and a metal disc clamped to the varistor disc (72) so as to form an electrical connection thereto.

9. The varistor (50) of claim 1, wherein the conductor layers are electrically isolated from one another when the varistor disc (72) is in its dielectric state, by the dimensions of the conductor layers being different to those of varistor disc (72) to form a peripheral gap around the edges of the varistor disc (72).

10. The varistor of claim 9, comprising an insulating rim around a periphery of the varistor disc (72) and/or around the periphery of the through hole.

11. The varistor (50) of claim 1, wherein the first conductor layer is electrically connected to the feed-through conductor (52) via a direct connection between the first conductor layer and the feed-through conductor (52), or via an intermediate flexible metal component to minimise thermal mismatch.

12. The varistor (50) of claim 11, wherein the connection method comprises any one or more of the group comprising: soldering, brazing; and the provision of a conductive bush (84) or gasket mechanically and electrically coupling the feed-through conductor (52) to the first conductor layer.

13. The varistor (50) of claim 1, wherein the second conductor layer is permanently electrically connected, in use, to ground (64) via a direct connection between the first conductor layer and ground (64).

14. The varistor of claim 13, wherein the connection method comprises one or more electrodes positioned on the second conductor layer, wherein electrodes can be pressed into electrical engagement with a grounded (64) conductive surface.

15. The varistor (50) of claim 1, wherein the disc assembly (70) is arranged substantially perpendicular to a longitudinal axis of the feed-through conductor (52), the input (56) and output (58) ends of the feed-through conductor (52) being located on opposite sides of the varistor disc (72), and when used in conjunction with a ground plane of a device to be protected, the input (56) and output (58) ends of the feed-through conductor (52) are located on opposite sides of the ground plane.

16. The varistor (50) of claim 1, comprising a plurality of feed-through conductors (52) and a corresponding plurality of through apertures (60) in the varistor disc assembly (70), the first conductor plate (74) comprising a corresponding number of first conductor portions, the first conductor portions being electrically insulated from one another.

* * * * *